United States Patent
Yamamoto et al.

(10) Patent No.: US 9,581,092 B2
(45) Date of Patent: Feb. 28, 2017

(54) CONTROL DEVICE FOR INTERNAL COMBUSTION ENGINE

(71) Applicants: Shunsuke Yamamoto, Chiryu (JP); Toyokazu Nakashima, Mie-ken (JP)

(72) Inventors: Shunsuke Yamamoto, Chiryu (JP); Toyokazu Nakashima, Mie-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/779,222

(22) PCT Filed: Mar. 18, 2014

(86) PCT No.: PCT/JP2014/057213
§ 371 (c)(1),
(2) Date: Sep. 22, 2015

(87) PCT Pub. No.: WO2014/162861
PCT Pub. Date: Oct. 9, 2014

(65) Prior Publication Data
US 2016/0069279 A1    Mar. 10, 2016

(30) Foreign Application Priority Data

Apr. 1, 2013   (JP) .................................. 2013-076399

(51) Int. Cl.
*F01L 1/34* (2006.01)
*F02D 13/02* (2006.01)
(Continued)

(52) U.S. Cl.
CPC .......... *F02D 13/0203* (2013.01); *F01L 1/344* (2013.01); *F01L 1/3442* (2013.01);
(Continued)

(58) Field of Classification Search
CPC .......... F01L 1/3442; F01L 2001/34453; F02D 13/0203
(Continued)

(56) References Cited

U.S. PATENT DOCUMENTS 8,919,306 B2 * 12/2014 Nakashima ........... F01L 1/3442
123/90.15
2011/0023805 A1   2/2011 Takemura
2014/0165939 A1   6/2014 Ito et al.

FOREIGN PATENT DOCUMENTS

JP        11-182214        7/1999
JP        2002-168138      6/2002
(Continued)

OTHER PUBLICATIONS

International Preliminary Report on Patentability issued Mar. 18, 2014 in PCT/JP2014/057213.

(Continued)

*Primary Examiner* — Ching Chang
(74) *Attorney, Agent, or Firm* — Oblon, McClelland, Maier & Neustadt, L.L.P.

(57) ABSTRACT

A control device for an internal combustion engine includes a controller. The controller controls the relative rotation phase of the exhaust camshaft in accordance with the relative rotation phase of the intake camshaft. When a request for locking the relative rotation phase of the intake camshaft at an intermediate phase is generated, the controller controls the relative rotation phase of the exhaust camshaft such that the relative rotation phase of the exhaust camshaft is changed to a phase corresponding to the intermediate phase independently from the relative rotation phase of the intake camshaft.

8 Claims, 6 Drawing Sheets

(51) Int. Cl.
*F01L 1/344* (2006.01)
*F01L 1/356* (2006.01)
(52) U.S. Cl.
CPC .......... *F01L 1/356* (2013.01); *F02D 13/0219* (2013.01); *F01L 2001/34453* (2013.01); *Y02T 10/18* (2013.01)
(58) Field of Classification Search
USPC .......................................... 123/90.15, 90.17
See application file for complete search history.

(56) References Cited

FOREIGN PATENT DOCUMENTS

| | | |
|---|---|---|
| JP | 2003-49671 | 2/2003 |
| JP | 2011-32904 | 2/2011 |
| JP | 2011-179418 | 9/2011 |
| JP | 2012-17723 | 1/2012 |
| JP | 2012-219767 | 11/2012 |
| JP | 2013-53616 | 3/2013 |

OTHER PUBLICATIONS

International Search Report issued Jun. 24, 2014, in PCT/JP2014/057213 filed Mar. 18, 2014.

* cited by examiner

CONTROL DEVICE FOR INTERNAL COMBUSTION ENGINE

TECHNICAL FIELD

The present invention relates to a control device for an internal combustion engine capable of changing the valve timing of the intake valves and the valve timing of the exhaust valves by changing the rotation phase of the intake camshaft relative to the crankshaft.

BACKGROUND ART

Conventionally, an internal combustion engine including an intake-side hydraulic drive variable valve timing mechanism is known. See, for example, Patent Document 1. Such an engine changes the valve timing of the intake valves by changing the rotation phase of the intake camshaft relative to the crankshaft with a variable valve timing mechanism.

The engine also includes a lock mechanism for mechanically locking the relative rotation phase of the intake camshaft at an intermediate phase, which is between the most retarded phase and the most advanced phase. Specifically, a vane rotor having vanes is arranged integrally with the intake camshaft. One of the vanes has a lock pin, which is selectively projected and retracted by hydraulic pressure. The vane rotor is accommodated in a housing, which rotates integrally with the crankshaft via the timing chain. The housing has a lock hole, into which the lock pin can be inserted, and a ratchet groove, which extends from the lock hole to the phase retarding side and is shallower than the lock hole.

When a request for locking the relative rotation phase of the intake camshaft at the intermediate phase at stoppage of the engine, the control device for the engine controls the relative rotation phase of the intake camshaft such that the relative rotation phase of the intake camshaft is changed to fall within a predetermined phase range corresponding to the ratchet groove and inserts the lock pin into the ratchet groove. Then, when the intake camshaft is relatively rotated to the intermediate phase through ratchet action, or, in other words, the lock pin is moved to the position of the lock hole through the relative rotation, the lock pin is inserted into the lock hole, thus bringing about a locked state. In this manner, the relative rotation phase of the intake camshaft is mechanically locked at the intermediate phase. The relative rotation phase of the intake camshaft is thus maintained at the intermediate phase, which is suitable for engine start, until the engine is re-started.

PRIOR ART DOCUMENT

Patent Document

Patent Document 1: Japanese Laid-Open Patent Publication No. 2011-32904

SUMMARY OF THE INVENTION

Problems that the Invention is to Solve

Some internal combustion engines have an exhaust-side hydraulic drive variable valve timing mechanism, which, like the intake-side variable valve timing mechanism, changes the valve timing of the exhaust valves by changing the rotation phase of the exhaust camshaft relative to the crankshaft. In some of these cases, to ensure cost-effectiveness, a lock mechanism is arranged only on the intake side and the exhaust-side variable valve timing mechanism is not provided with a lock mechanism.

If this is the case, the problem described below may occur when the relative rotation phase of the intake camshaft is locked at the intermediate phase. That is, the relative rotation phase of the exhaust camshaft is set in accordance with the relative rotation phase of the intake camshaft such that the amount of valve overlap of the intake valve and the exhaust valve becomes suitable for the current engine operating state. Accordingly, as the intake camshaft is relatively rotated toward the intermediate phase, the exhaust camshaft may be relatively rotated abruptly toward the phase corresponding to the intermediate phase in a manner following the relative rotation of the intake camshaft. In this case, although the relative rotation phase of the intake camshaft is locked at the intermediate phase, the relative rotation phase of the exhaust camshaft may overshoot the phase set in accordance with the intermediate phase. This may cause an abrupt change in the engine output when the relative rotation phase of the intake camshaft is locked at the intermediate phase.

Accordingly, it is an objective of the present invention to provide a control device for an internal combustion engine capable of restraining an abrupt change of the engine output in a favorable manner when the rotation phase of the intake camshaft relative to the crankshaft is locked at the intermediate phase.

Means for Solving the Problems

To achieve the foregoing objective and in accordance with one aspect of the present invention, a control device for an internal combustion engine is provided. The engine includes an intake-side hydraulic drive variable valve timing mechanism configured to change a valve timing of an intake valve by changing a rotation phase of an intake camshaft relative to a crankshaft, an exhaust-side hydraulic drive variable valve timing mechanism configured to change a valve timing of an exhaust valve by changing a rotation phase of an exhaust camshaft relative to the crankshaft, and a lock mechanism configured to mechanically lock the relative rotation phase of the intake camshaft at an intermediate phase between a most retarded phase and a most advanced phase. The control device includes a controller. The controller controls the relative rotation phase of the exhaust camshaft in accordance with the relative rotation phase of the intake camshaft. When a request for locking the relative rotation phase of the intake camshaft at the intermediate phase is generated, the controller controls the relative rotation phase of the exhaust camshaft such that the relative rotation phase of the exhaust camshaft is changed to a phase corresponding to the intermediate phase independently from the relative rotation phase of the intake camshaft.

MODES FOR CARRYING OUT THE INVENTION

A control device for an internal combustion engine according to one embodiment of the present invention will now be described with reference to FIGS. 1 to 6B. The control device is employed for an on-vehicle internal combustion engine.

Figure 1:
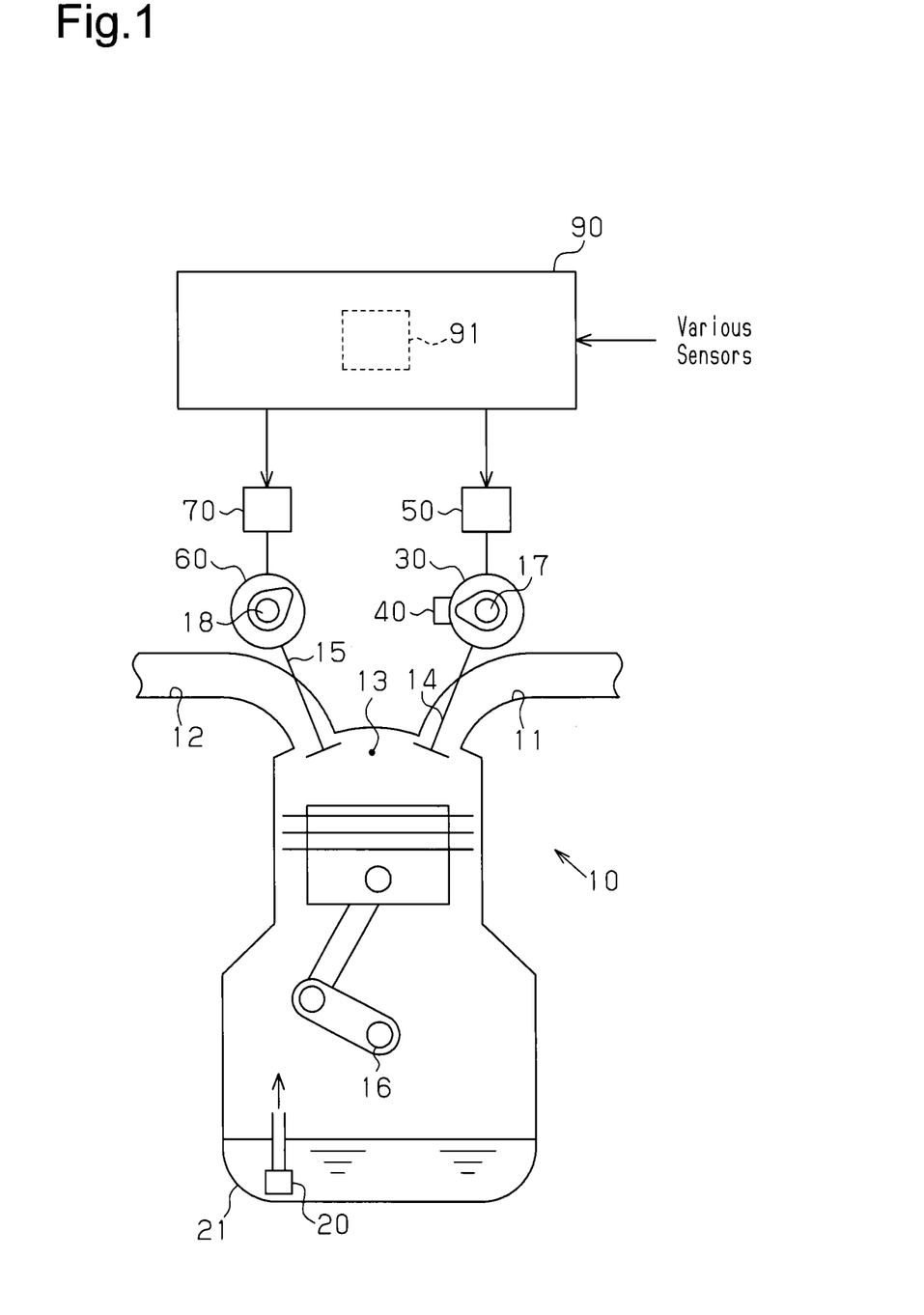
FIG. 1 is a schematic diagram showing the configuration of a control device for an internal combustion engine according to one embodiment and an internal combustion engine as the control target of the control device.

As shown in FIG. 1, an intake passage 11 and an exhaust passage 12 are connected to each of the cylinders of an internal combustion engine 10. The engine 10 has an intake valve 14, which selectively permits and blocks communication between the intake passage 11 and a combustion chamber 13. The engine 10 also has an exhaust valve 15, which selectively permits and blocks communication between the exhaust passage 12 and the combustion chamber 13.

A piston is arranged in each cylinder in a reciprocally movable manner. A crankshaft 16 is joined to each of the pistons via a connecting rod.

An intake camshaft 17 and an exhaust camshaft 18 are also provided, to each of which rotation of the crankshaft 16 is transmitted through a non-illustrated timing chain. The intake camshaft 17 and the exhaust camshaft 18 rotate to selectively open and close the intake valve 14 and the exhaust valve 15, respectively.

In the engine 10, the air drawn into the combustion chamber 13 via the intake passage 11 and the fuel injected from a non-illustrated fuel injection valve are mixed with each other to form air-fuel mixture. The pistons are reciprocated through combustion pressure, which is produced by burning the air-fuel mixture. The crankshaft 16 is thus rotated through the pistons. Exhaust air, which is produced by burning the air-fuel mixture, is discharged via the exhaust passage 12.

The engine 10 has an intake-side variable valve timing mechanism 30, which changes the valve timing of the intake valve 14 by changing the rotation phase of the intake camshaft 17 relative to the crankshaft 16 (hereinafter, referred to simply as the relative rotation phase of the intake camshaft 17). The engine 10 also has an exhaust-side hydraulic drive variable valve timing mechanism 60, which changes the valve timing of the exhaust valve 15 by changing the rotation phase of the exhaust camshaft 18 relative to the crankshaft 16 (hereinafter, referred to simply as the relative rotation phase of the exhaust camshaft 18).

The intake-side variable valve timing mechanism 30 will now be described.

Figure 2:
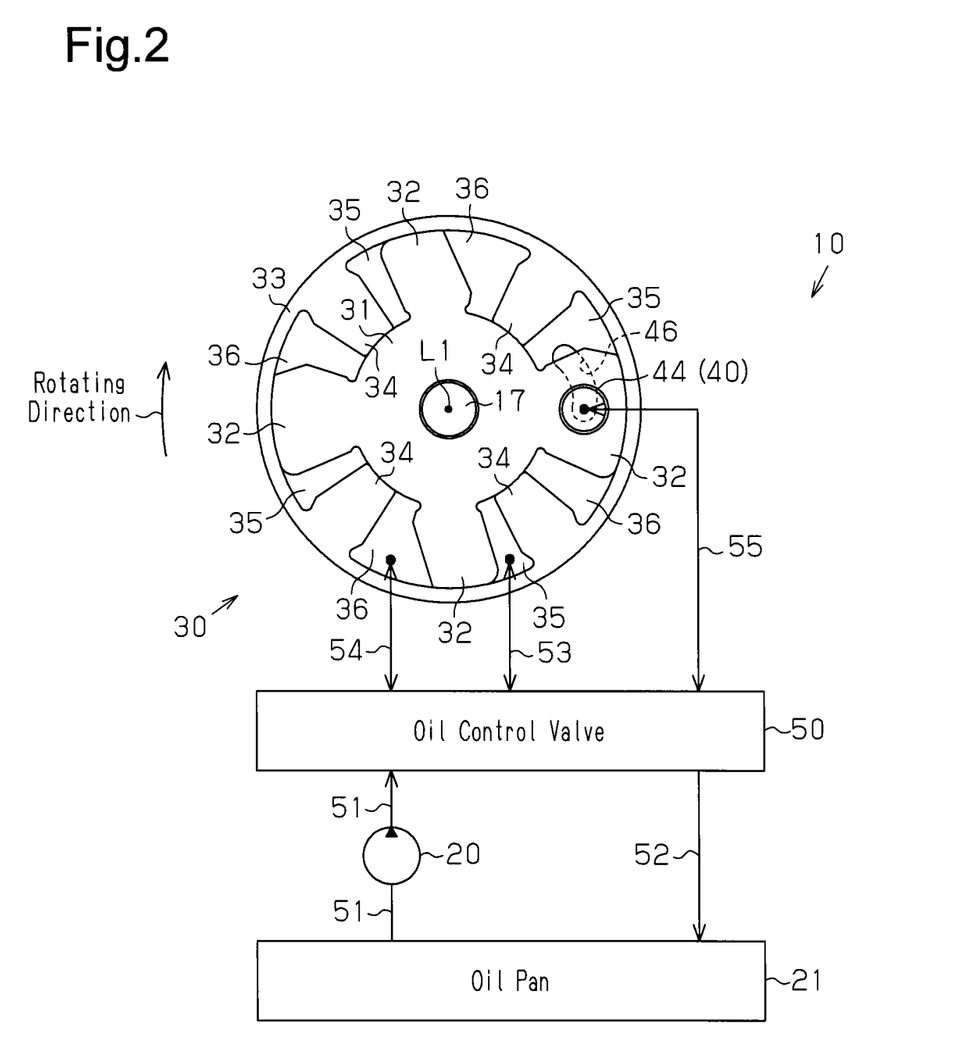
FIG. 2 is a schematic diagram showing the configuration of an intake-side variable valve timing mechanism of the embodiment.

With reference to FIG. 2, the intake-side variable valve timing mechanism 30 includes a vane rotor 31 and a housing 33. The vane rotor 31 is fixed to the intake camshaft 17 and rotates integrally with the intake camshaft 17. The housing 33 is arranged around the vane rotor 31. Rotation of the crankshaft 16 is transmitted to the housing 33 via the timing chain.

The housing 33 and the vane rotor 31 are arranged coaxial with each other. Four projections 34, which project toward the axis L1 of the intake camshaft 17, are formed on the inner circumferential surface of the housing 33 and spaced apart circumferentially at predetermined intervals.

The vane rotor 31 has four vanes 32 on the outer circumferential surface. Each vane 32 is located between adjacent two of the projections 34 of the housing 33. The space defined by end faces of each adjacent pair of the projections 34 of the housing 33, the inner circumferential surface of the housing 33, and the outer circumferential surface of the vane rotor 31 is thus divided into two hydraulic chambers (a phase advancing chamber 35 and a phase retarding chamber 36) by the corresponding one of the vanes 32.

When oil is supplied to the phase advancing chambers 35 and drained from the phase retarding chambers 36 in the intake-side variable valve timing mechanism 30, the vane rotor 31 is rotated relative to the housing 33 clockwise as viewed in FIG. 2 and the relative rotation phase of the intake camshaft 17 is advanced. That is, the relative rotation phase of the intake camshaft 17 is changed to the leading side in the rotating direction. This advances the valve timing of the intake valve 14.

If oil is supplied to the phase retarding chambers 36 and drained from the phase advancing chambers 35, the vane rotor 31 is rotated relative to the housing 33 counterclockwise as viewed in FIG. 2 and the relative rotation phase of the intake camshaft 17 is retarded. The relative rotation phase of the intake camshaft 17 is changed to the trailing side in the rotating direction. This retards the valve timing of the intake valve 14.

The exhaust-side variable valve timing mechanism 60 is configured basically identical with the intake-side variable valve timing mechanism 30. Repetitive description of the exhaust-side variable valve timing mechanism 60 is thus omitted herein.

The intake-side variable valve timing mechanism 30 has a lock mechanism 40, which restricts relative rotation of the intake camshaft 17 when the engine 10 is started. The lock mechanism 40 is arranged only in the intake-side variable valve timing mechanism 30. The exhaust-side variable valve timing mechanism 60 has no lock mechanism.

The lock mechanism 40 will now be described.

Figure 3A:
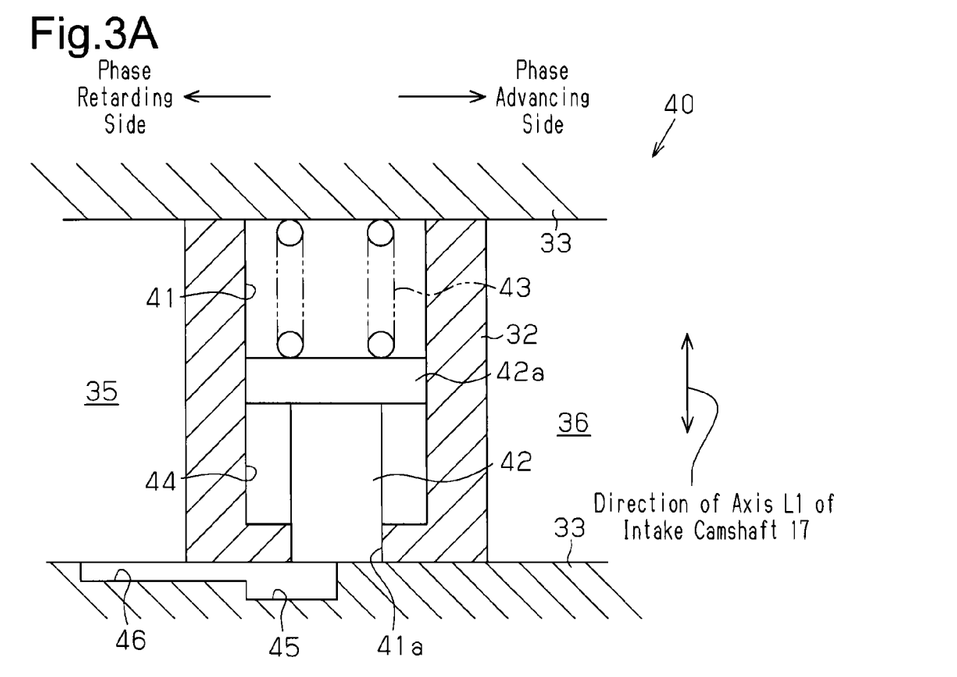
FIGS. 3A and 3B are cross-sectional views showing a lock mechanism of the embodiment.
Figure 3B:
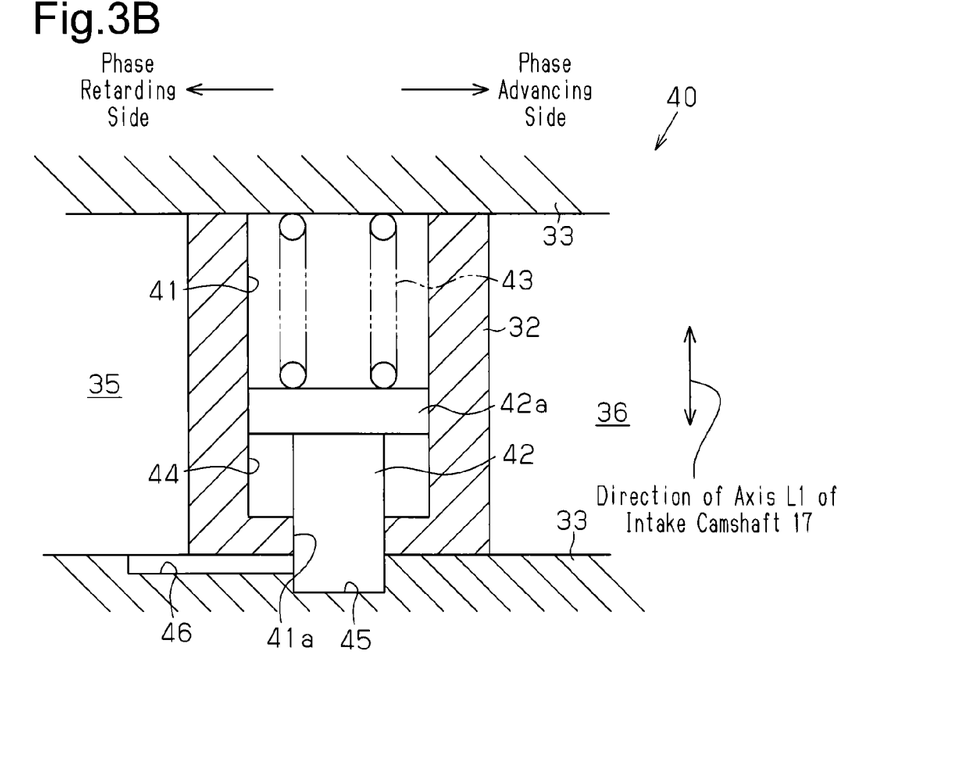

As illustrated in FIGS. 2, 3A, and 3B, the lock mechanism 40 is provided in one of the vanes 32 of the vane rotor 31.

Referring to FIGS. 3A and 3B, the vane 32 having the lock mechanism 40 has a stepped accommodation hole 41, which extends parallel to the axis L1 of the intake camshaft 17. A lock pin 42 is accommodated in the accommodation hole 41 in a projectable and retractable manner.

The lock pin 42 has a pressure receiving portion 42a, which is shaped to have an increased diameter, at the basal end. The lock pin 42 is movable in the direction of the axis L1 of the intake camshaft 17 in a state in which the outer circumferential surface of the pressure receiving portion 42a is held in slidable contact with the inner circumferential surface of the accommodation hole 41. The lock pin 42 is urged by a coil spring 43 in such a direction that the distal end of the lock pin 42 exits to the exterior through a stepped portion 41a of the accommodation hole 41.

An unlocking pressure chamber 44, which is an annular space, is defined between the pressure receiving portion 42a of the lock pin 42 and the stepped portion 41a of the accommodation hole 41.

When oil is supplied to the unlocking pressure chamber 44 in the lock mechanism 40, the lock pin 42 is urged by the pressure produced by the oil and moves against the urging force of the coil spring 43 in the direction in which the lock pin 42 is retracted into the accommodation hole 41. If the oil is drained from the unlocking pressure chamber 44, the lock pin 42 is moved by the urging force of the coil spring 43 in the direction in which the lock pin 42 protrudes from the accommodation hole 41.

The housing 33 has a lock hole 45, which serves as a recess configured to receive the distal end of the lock pin 42. The lock hole 45 is arranged at such a position that the relative rotation phase of the intake camshaft 17 corresponds to an intermediate position between the most retarded phase, which is the control limit phase in the phase retarding direction in a controllable range, and the most advanced phase, which is the control limit phase in the phase advancing direction. The intermediate phase is defined as a locked phase, which is the relative rotation phase of the intake camshaft 17 that is suitable for starting the engine 10.

As shown in FIGS. 2, 3A, and 3B, the housing 33 has a ratchet groove 46, which is shallower than the lock hole 45. The ratchet groove 46 extends from the lock hole 45 to the phase retarding side along the circumference of the housing 33.

When the relative rotation phase of the intake camshaft 17 is in the range corresponding to the location of the ratchet groove 46, the distal end of the lock pin 42 is inserted into the ratchet groove 46 by draining oil from the unlocking pressure chamber 44. Then, when the intake camshaft 17 is relatively rotated to the intermediate position through ratchet action, or, in other words, when the lock pin 42 is moved to the position of the lock hole 45 in the housing 33 through relative rotation of the intake camshaft 17, the lock pin 42 is inserted into the lock hole 45. This mechanically locks the vanes 32 of the intake-side variable valve timing mechanism 30 to the housing 33. As a result, the relative rotation phase of the intake camshaft 17 is locked at the intermediate phase.

If oil is supplied to the unlocking pressure chamber 44 in a locked state, in which the vanes 32 of the intake-side variable valve timing mechanism 30 are mechanically locked to the housing 33, the lock pin 42 exits the lock hole 45 and the lock mechanism 40 is switched to an unlocked state.

As illustrated in FIG. 2, the engine 10 has an oil pump 20, which supplies oil to the intake-side variable valve timing mechanism 30 and the lock mechanism 40. The intake-side variable valve timing mechanism 30, the lock mechanism 40, and the oil pump 20 are connected together by a hydraulic circuit, which includes an oil control valve 50. Operation of the oil control valve 50 is controlled to control the supply-drainage modes of oil to the phase advancing chambers 35 and the phase retarding chambers 36 of the intake-side variable valve timing mechanism 30 and the unlocking pressure chamber 44 of the lock mechanism 40.

The oil control valve 50 is connected to the oil pan 21, which retains oil, via a supply passage 51. The oil pump 20 is arranged in the supply passage 51. The oil from the oil pump 20 is supplied to the oil control valve 50 via the supply passage 51. The oil control valve 50 is also connected to an oil pan 21 via a drainage passage 52. Oil is drained from the phase advancing chambers 35, the phase retarding chambers 36, or the lock mechanism 40 into the oil pan 21 via the drainage passage 52.

The oil control valve 50 is connected to the phase advancing chambers 35 and the phase retarding chambers 36 of the intake-side variable valve timing mechanism 30 via a phase advancing oil line 53 and a phase retarding oil line 54, respectively. The oil control valve 50 is connected also to the unlocking pressure chamber 44 of the lock mechanism 40 via a lock oil line 55.

The engine 10 has a non-illustrated hydraulic circuit that connects the exhaust-side variable valve timing mechanism 60 and the oil pump 20 to each other.

That is, with reference to FIG. 1, an oil control valve 70 is arranged in the hydraulic circuit of the exhaust-side variable valve timing mechanism 60, and operation of the oil control valve 70 is controlled to control supply-drainage modes of oil for a phase advancing chamber and a phase retarding chamber of the exhaust-side variable valve timing mechanism 60. The hydraulic circuit is configured basically identical with the hydraulic circuit of the intake-side variable valve timing mechanism 30. Therefore, repetitive description of the hydraulic circuit of the exhaust-side variable valve timing mechanism 60 is omitted herein.

As illustrated in FIG. 1, various sensors are employed to detect the traveling state of the vehicle and the operating state of the engine 10.

The sensors include, for example, a vehicle speed sensor for detecting the traveling speed of the vehicle, an accelerator sensor for detecting the accelerator depression amount, a throttle sensor for detecting the opening degree of the throttle valve, an air flowmeter for detecting the intake air amount, and a temperature sensor for detecting the engine temperature. The sensors also include sensors such as a crank angle sensor for detecting the engine speed, which is the rotation speed of the crankshaft 16, an intake-side cam angle sensor for detecting the relative rotation phase of the intake camshaft 17, which is the valve timing of the intake valve 14, and an exhaust-side cam angle sensor for detecting the relative rotation phase of the exhaust camshaft 18, which is the valve timing of the exhaust valve 15.

Various types of control of the engine 10 are executed by an electronic control unit 90, which includes a microcomputer, for example. The electronic control unit 90 receives detection signals from the various sensors and carries out various calculations based on the detection signals. Based on the results of the calculations, the electronic control unit 90 performs throttle control, which is control of the opening degree of the throttle valve, fuel injection control, and ignition timing control in known modes. The electronic control unit 90 includes a controller 91, which carries out operation control of the variable valve timing mechanisms 30, 60 and the lock mechanism 40. The electronic control unit 90 configures a control device for an internal combustion engine. The engine 10 and the electronic control unit 90 configure a control system for an internal combustion engine.

The throttle control is executed in the manner described below. That is, a requested intake air amount, which is the control target of the intake air amount, is calculated based on the accelerator depression amount and the engine speed. Subsequently, based on the requested intake air amount and the engine speed, a target throttle opening degree, which is the control target of the throttle opening degree, is calculated. Operation of a motor for selectively opening and closing the throttle valve is controlled such that the target throttle opening degree and the actual throttle opening degree become equal to each other.

Operation control of the intake-side variable valve timing mechanism 30, which is operation control of the oil control valve 50, is performed in the manner described below.

When the engine 10 is in operation, operation of the oil control valve 50 is controlled basically to supply oil into the unlocking pressure chamber 44 of the lock mechanism 40. The lock mechanism 40 is thus held in an unlocked state. Also, the control target of the relative rotation phase of the intake camshaft 17, which is the control target of the valve timing of the intake valve 14, is calculated based on the aforementioned requested intake air amount and engine speed. The operation control of the oil control valve 50 is performed such that the calculated control target and the actual relative rotation phase of the intake camshaft 17 become equal to each other. The operation control of the oil control valve 50 is carried out to achieve efficient introduction of intake air into the combustion chamber 13 of the engine 10.

Operation control of the exhaust-side variable valve timing mechanism 60, which is operation control of the oil control valve 70, is executed in the manner described below.

The control target of the relative rotation phase of the exhaust camshaft 18, which is the control target of the valve timing of the exhaust valve 15, is calculated using the control target of the relative rotation phase of the intake camshaft 17 and the control target of the valve overlap amount, which is calculated based on the current engine state in a known mode. Valve overlap refers to a period in which the intake valve 14 and the exhaust valve 15 are both open. The operation control of the oil control valve 70 is carried out such that the control target of the relative rotation phase of the exhaust camshaft 18 and the actual relative rotation phase of the exhaust camshaft 18 become equal to each other.

In the present embodiment, engine operation in a combustion cycle with an expansion ratio exceeding the compression ratio (Atkinson cycle) is carried out in a moderate-load moderate-speed range, in which the requested intake air amount and the engine speed are both moderate. For example, by controlling the valve timing of the intake valve 14 to become the most retarded timing, which is the most retarded timing in the control range, the valve closing time of the intake valve 14 is set to a predetermined time in a compression stroke. In this manner, engine operation in Atkinson cycle is brought about. Such engine operation in Atkinson cycle improves thermal efficiency compared to engine operation in a typical combustion cycle with a compression ratio equal to the expansion ratio (Otto cycle). This improves the fuel efficiency.

In the process of stopping the engine 10, operation control of the oil control valve 50 is executed such that the relative rotation phase of the intake camshaft 17 corresponds to the intermediate rotation phase and that oil is drained from the unlocking pressure chamber 44. In this manner, the relative rotation phase of the intake camshaft 17 is locked at the intermediate phase by means of the lock mechanism 40.

Therefore, the relative rotation phase of the intake camshaft 17 is maintained at the intermediate phase, which is suitable for engine start, in the engine starting process. The engine 10 is thus started appropriately.

In conventional operation control of the oil control valve 70, the problem described below may occur.

Figure 4A:
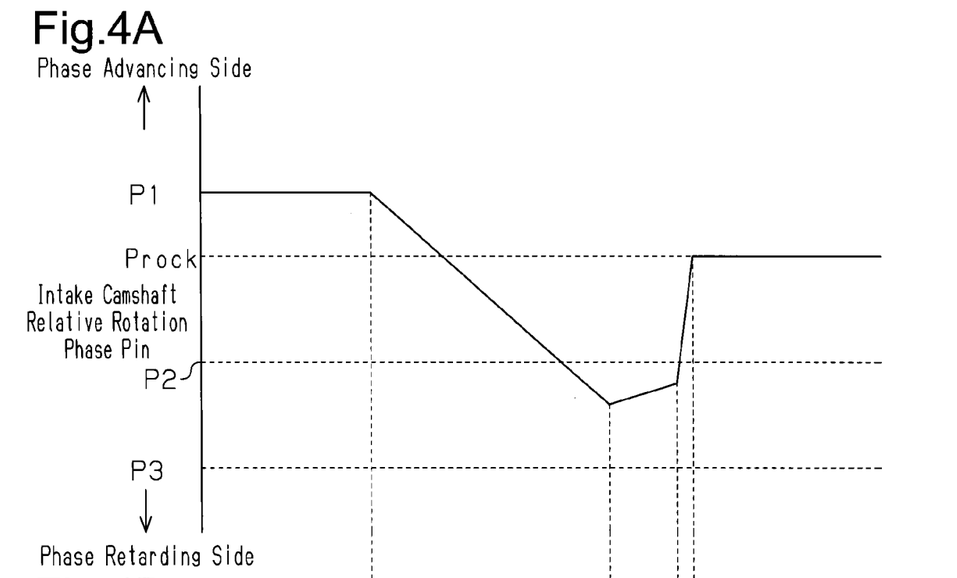
FIGS. 4A and 4B are timing diagrams each representing an example of changes in relative rotation phases of an intake camshaft and an exhaust camshaft in conventional control when a request for locking the relative rotation phase of the intake camshaft at an intermediate phase is generated.
Figure 4B:
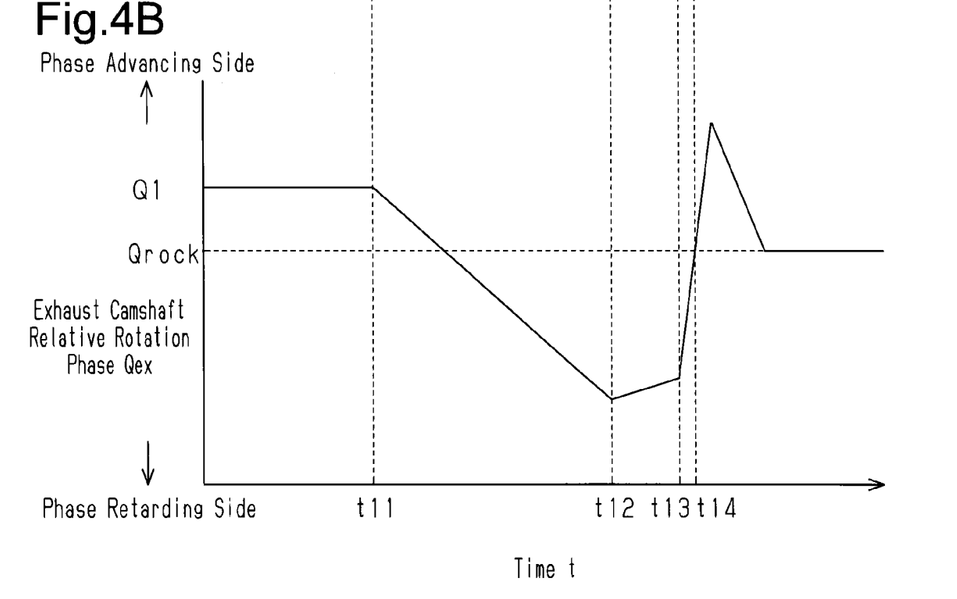

That is, as represented in FIGS. 4A and 4B, at time t11 in the stopping process of the engine 10, the relative rotation phase $P_{in}$ of the intake camshaft 17 is at the first phase P1, which is advanced with respect to the intermediate phase $P_{rock}$. If, at this stage, a request for locking the relative rotation phase $P_{in}$ of the intake camshaft 17 at the intermediate phase $P_{rock}$ is generated, the relative rotation phase $P_{in}$ of the intake camshaft 17 is changed to fall within a predetermined phase range (P3≤$P_{in}$≤P2) corresponding to the location of the ratchet groove 46. At time t12, at which the relative rotation phase $P_{in}$ of the intake camshaft 17 falls within the aforementioned predetermined phase range, oil is drained from the unlocking pressure chamber 44. The distal end of the lock pin 42 is thus inserted into the ratchet groove 46 at time t13. At time t14, the relative rotation phase $P_{in}$ of the intake camshaft 17 is locked at the intermediate phase $P_{rock}$.

At this stage, in the conventional operation control of the oil control valve 70, the relative rotation phase $Q_{ex}$ of the exhaust camshaft 18 is controlled in accordance with the relative rotation phase $P_{in}$ of the intake camshaft 17.

That is, referring to FIGS. 4A and 4B, at time t11, the relative rotation phase $Q_{ex}$ of the exhaust camshaft 18 is the first phase Q1, which is advanced with respect to the phase $Q_{rock}$ corresponding to the intermediate phase $P_{rock}$. The phase $Q_{rock}$ is such a phase that, as long as the relative rotation phase $P_{in}$ of the intake camshaft 17 is the intermediate phase $P_{rock}$ and the relative rotation phase $Q_{ex}$ of the exhaust camshaft 18 is the phase $Q_{rock}$, the valve overlap amount of the intake valve 14 and the exhaust valve 15 becomes suitable for the current engine operating state. The phase $Q_{rock}$ is set in advance through experimentation the like.

In the period from time t11 to time t14, the relative rotation phase $Q_{ex}$ of the exhaust camshaft 18 is changed in a manner following the relative rotation phase $P_{in}$ of the intake camshaft 17.

As has been described, the exhaust-side variable valve timing mechanism 60 has no lock mechanism. Accordingly, if the relative rotation phase $P_{in}$ of the intake camshaft 17 is abruptly changed to the intermediate phase $P_{rock}$ through relative rotation of the intake camshaft 17 in the period from time t13 to time t14, the relative rotation phase $P_{in}$ of the intake camshaft 17 is mechanically locked at the intermediate phase $P_{rock}$ at time t14. However, since the exhaust camshaft 18 has been relatively rotated abruptly in the phase advancing direction, the relative rotation phase $Q_{ex}$ of the exhaust camshaft 18 overshoots the phase $Q_{rock}$, which corresponds to the intermediate phase $P_{rock}$. This rapidly changes the engine output and thus lowers the drivability.

In the present embodiment, to restrain the aforementioned disadvantage, the relative rotation phase $Q_{ex}$ of the exhaust camshaft 18 is controlled by means of the electronic control unit 90 in the manner described below. That is, if a request for locking the relative rotation phase $P_{in}$ of the intake camshaft 17 at the intermediate phase $P_{rock}$ is generated, the relative rotation phase $Q_{ex}$ of the exhaust camshaft 18 is controlled such that the relative rotation phase $Q_{ex}$ of the exhaust camshaft 18 is changed to the phase $Q_{rock}$, which corresponds to the intermediate phase $P_{rock}$, independently from the relative rotation phase $P_{in}$ of the intake camshaft 17. More specifically, the relative rotation phase $Q_{ex}$ of the exhaust camshaft 18 is controlled such that the relative rotation phase $Q_{ex}$ of the exhaust camshaft 18 is changed directly to the phase $Q_{rock}$, which corresponds to the intermediate phase $P_{rock}$.

The request for locking the relative rotation phase $P_{in}$ of the intake camshaft 17 at the intermediate phase $P_{rock}$ may be generated when the engine 10 is in the stopping process. It is thus preferable to control the relative rotation phase of the exhaust camshaft 18 independently from the relative rotation phase of the intake camshaft 17 when the engine 10 is in the stopping process.

Next, with reference to FIG. 5, steps of a procedure of setting the control target $Q_{extrg}$ of the relative rotation phase of the exhaust camshaft 18 will be described. The series of procedure represented in FIG. 5 is executed by the controller 91 repeatedly at predetermined intervals.

Figure 5:
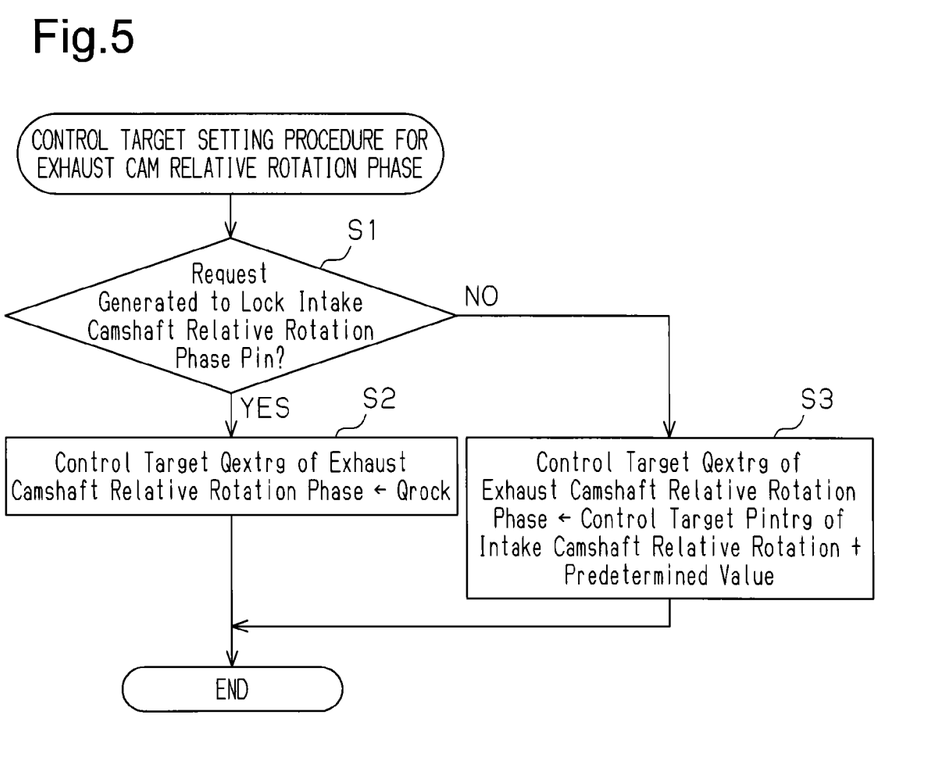
FIG. 5 is a flowchart representing steps of a procedure for setting a control target of the relative rotation phase of the exhaust camshaft of the embodiment.

With reference to FIG. 5, in the procedure, a determination is made as to whether a request for locking the relative rotation phase $P_{in}$ of the intake camshaft 17 at the intermediate phase $P_{rock}$ has been generated (Step S1). That is, the controller 91 determines whether a request for locking the relative rotation phase $P_{in}$ of the intake camshaft 17 at the intermediate phase $P_{rock}$ has been generated.

If a negative determination is made in Step S1 (Step S1: NO), a value determined by adding a predetermined value to the control target $P_{intrg}$ of the relative rotation phase of the intake camshaft 17 is set as the control target $Q_{extrg}$ of the relative rotation phase of the exhaust camshaft 18 (Step S3). The procedure is then suspended. The aforementioned predetermined value is varied in accordance with the engine operating state. The actual relative rotation phase of the exhaust camshaft 18 is controlled to become equal to the control target $Q_{extrg}$ of the relative rotation phase of the exhaust camshaft 18. As a result, the valve overlap amount of the intake valve 14 and the exhaust valve 15 is set to a value suitable for the engine operating state.

In contrast, when a positive determination is made in Step S1 (Step S1: YES), the phase $Q_{rock}$, which corresponds to the intermediate phase $P_{rock}$ is set as the control target $Q_{extrg}$ of the relative rotation phase of the exhaust camshaft 18 (Step S2). The procedure is then suspended. That is, when the controller 91 determines that a request for locking the relative rotation phase $P_{in}$ of the intake camshaft 17 at the intermediate phase $F_{rock}$ has been generated, the controller 91 controls the relative rotation phase of the exhaust camshaft 18 independently from the relative rotation phase of the intake camshaft 17.

Operation of the present embodiment will now be described.

When the engine is in operation, the relative rotation phase $Q_{ex}$ of the exhaust camshaft 18 is controlled basically in accordance with the relative rotation phase $P_{in}$ of the intake camshaft 17. That is, the valve timing of the exhaust valve 15 is controlled in accordance with the valve timing of the intake valve 14 in a favorable manner. In other words, the valve timing of the exhaust valve 15 is controlled in a manner following the valve timing of the intake valve 14 in a favorable manner.

Figure 6A:
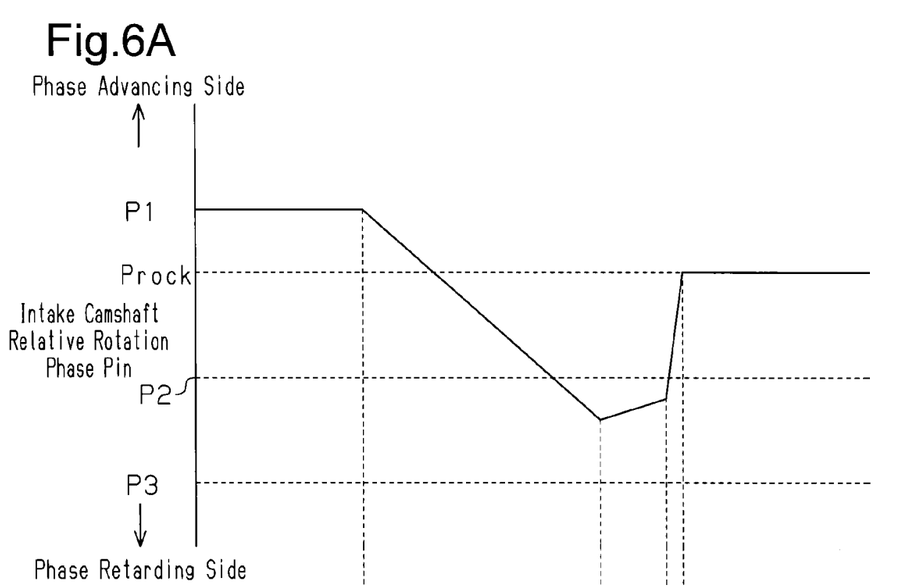
FIGS. 6A and 6B are timing diagrams each representing an example of changes in the relative rotation phases of the intake camshaft and the exhaust camshaft in the embodiment when a request for locking the relative rotation phase of the intake camshaft at the intermediate phase is generated.
Figure 6B:
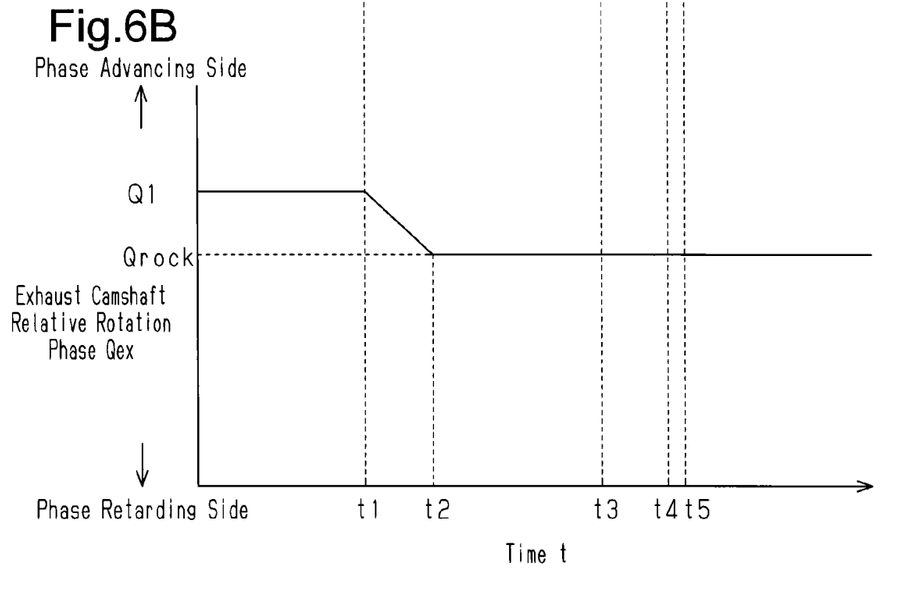

As represented in FIGS. 6A and 6B, as a request for locking the relative rotation phase $P_{in}$ of the intake camshaft 17 at the intermediate phase $P_{rock}$ is generated at time t1, the relative rotation phase $Q_{ex}$ of the exhaust camshaft 18 is changed directly to the phase $Q_{rock}$, which corresponds to the intermediate phase $P_{rock}$, independently from the relative rotation phase $P_{in}$ of the intake camshaft 17 (at time t2). That is, the controller 91 maintains the relative rotation phase $Q_{ex}$ of the exhaust camshaft 18 at the constant phase $Q_{rock}$ regardless of the relative rotation phase $P_{in}$ of the intake camshaft 17. As a result, the relative rotation phase $P_{in}$ of the intake camshaft 17 is locked at the intermediate phase $P_{rock}$ and the relative rotation phase $Q_{ex}$ of the exhaust camshaft 18 is maintained without overshooting the phase $Q_{rock}$, which is set in accordance with the intermediate phase $P_{rock}$. This restrains an abrupt change of engine output caused by locking the valve timing of the intake valve 14 at the valve timing corresponding to the intermediate phase $P_{rock}$.

The control device for an internal combustion engine according to the above described embodiment has the following advantages.

(1) The electronic control unit 90 controls the relative rotation phase $Q_{ex}$ of the exhaust camshaft 18 in accordance with the relative rotation phase $P_{in}$ of the intake camshaft 17. The electronic control unit 90 includes the controller 91. When a request for locking the relative rotation phase $P_{in}$ of the intake camshaft 17 at the intermediate phase $P_{rock}$ is generated, the controller 91 controls the relative rotation phase $Q_{ex}$ of the exhaust camshaft 18 such that the relative rotation phase $Q_{ex}$ of the exhaust camshaft 18 is changed to the phase $Q_{rock}$, which corresponds to the intermediate phase $P_{rock}$, independently from the relative rotation phase $P_{in}$ of the intake camshaft 17. More specifically, when a request for locking the relative rotation phase $P_{in}$ of the intake camshaft 17 at the intermediate phase $P_{rock}$ is generated, the controller 91 controls the relative rotation phase $P_{in}$ of the intake camshaft 17 such that the relative rotation phase $P_{in}$ of the intake camshaft 17 is changed to fall within the predetermined phase range (P3≤$P_{in}$≤P2), which corresponds to the ratchet groove 46. At this time, the controller 91 controls the relative rotation phase of the exhaust camshaft 18 such that the relative rotation phase $Q_{ex}$ of the exhaust camshaft 18 is changed to the phase $Q_{rock}$, which corresponds to the intermediate phase $P_{rock}$, independently from the relative rotation phase $P_{in}$ of the intake camshaft 17.

In this configuration, the relative rotation phase $Q_{ex}$ of the exhaust camshaft 18 is controlled basically in accordance with the relative rotation phase $P_{in}$ of the intake camshaft 17. The valve timing of the exhaust valve 15 is thus controlled in accordance with the valve timing of the intake valve 14 in a favorable manner. When a request for locking the relative rotation phase $P_{in}$ of the intake camshaft 17 at the intermediate phase $P_{rock}$ is generated, the relative rotation phase $P_{in}$ of the intake camshaft 17 is locked at the intermediate phase $P_{rock}$ and the relative rotation phase $Q_{ex}$ of the exhaust camshaft 18 is maintained without overshooting the phase $Q_{rock}$, which is set in accordance with the intermediate phase. This restrains, in a desired manner, an abrupt change of engine output caused by locking the valve timing of the intake valve 14 at the valve timing corresponding to the intermediate phase $P_{rock}$.

The control device for an internal combustion engine according to the present invention is not limited to the configuration illustrated in the above-described embodiment, but may be modified as follows.

The ratchet groove may extend from the lock hole to the phase advancing side.

The invention claimed is:

1. A control device for an internal combustion engine, wherein the engine includes:
    an intake-side hydraulic drive variable valve timing mechanism that changes a valve timing of an intake valve by changing a rotation phase of an intake camshaft relative to a crankshaft;
    an exhaust-side hydraulic drive variable valve timing mechanism that changes a valve timing of an exhaust valve by changing a rotation phase of an exhaust camshaft relative to the crankshaft; and
    a lock mechanism that mechanically locks the relative rotation phase of the intake camshaft at an intermediate phase between a most retarded phase and a most advanced phase, wherein
    the lock mechanism is provided only in the intake-side variable valve timing mechanism,
    the control device comprises a controller,
    when no request for locking the relative rotation phase of the intake camshaft at the intermediate phase is generated, the controller controls the relative rotation phase of the exhaust camshaft in accordance with the relative rotation phase of the intake camshaft, and when a request for locking the relative rotation phase of the intake camshaft at the intermediate phase is generated, the controller controls the relative rotation phase of the exhaust camshaft such that the relative rotation phase of the exhaust camshaft is changed to a phase corresponding to the intermediate phase independently from the relative rotation phase of the intake camshaft.

2. The control device according to claim 1, wherein the lock mechanism includes
   a stopper member arranged in a first rotation body that rotates integrally with one of the crankshaft and the intake camshaft, and
   a recess formed in a second rotation body that rotates integrally with the other one of the crankshaft and the intake camshaft, the recess receiving the stopper member,
   the lock mechanism locks the relative rotation phase of the intake camshaft at the intermediate phase by inserting the stopper member into the recess,
   a ratchet groove is arranged in the second rotation body, wherein the ratchet groove extends from the recess to a phase advancing side or a phase retarding side and is shallower than the recess,
   the controller controls the relative rotation phase of the intake camshaft in addition to the relative rotation phase of the exhaust camshaft,
   when the request for locking the relative rotation phase of the intake camshaft at the intermediate phase is generated, the controller controls the relative rotation phase of the intake camshaft such that the relative rotation phase of the intake camshaft is changed to fall within a predetermined phase range corresponding to the ratchet groove and controls the relative rotation phase of the exhaust camshaft such that the relative rotation phase of the exhaust camshaft is changed directly to the phase corresponding to the intermediate phase.

3. The control device according to claim 2, wherein
   the request for locking the relative rotation phase of the intake camshaft at the intermediate phase is generated when the engine is in a stopping process, and
   when the engine is in the stopping process, the controller controls the relative rotation phase of the exhaust camshaft independently from the relative rotation phase of the intake camshaft.

4. The control device according to claim 3, wherein
   the controller determines whether the request for locking the relative rotation phase of the intake camshaft at the intermediate phase has been generated, and
   when determining that the request has been generated, the controller controls the relative rotation phase of the exhaust camshaft independently from the relative rotation phase of the intake camshaft.

5. The control device according to claim 2, wherein
   the controller determines whether the request for locking the relative rotation phase of the intake camshaft at the intermediate phase has been generated, and
   when determining that the request has been generated, the controller controls the relative rotation phase of the exhaust camshaft independently from the relative rotation phase of the intake camshaft.

6. The control device according to claim 1, wherein
   the request for locking the relative rotation phase of the intake camshaft at the intermediate phase is generated when the engine is in a stopping process, and
   when the engine is in the stopping process, the controller controls the relative rotation phase of the exhaust camshaft independently from the relative rotation phase of the intake camshaft.

7. The control device according to claim 6, wherein
   the controller determines whether the request for locking the relative rotation phase of the intake camshaft at the intermediate phase has been generated, and
   when determining that the request has been generated, the controller controls the relative rotation phase of the exhaust camshaft independently from the relative rotation phase of the intake camshaft.

8. The control device according to claim 1, wherein
   the controller determines whether the request for locking the relative rotation phase of the intake camshaft at the intermediate phase has been generated, and
   when determining that the request has been generated, the controller controls the relative rotation phase of the exhaust camshaft independently from the relative rotation phase of the intake camshaft.

* * * * *